United States Patent Office 3,216,579
Patented Nov. 9, 1965

3,216,579
WATER-INSOLUBLE POLYVINYLPYRROLIDONE COMPOSITION
Morris V. Shelanski, Gulph Mills, and Theodore Levenson, Wyndmoor, Pa., assignors to Industrial Biology Laboratories, Inc., Philadelphia, Pa., a corporation of Pennsylvania
No Drawing. Filed May 25, 1961, Ser. No. 112,525
4 Claims. (Cl. 210—501)

This invention relates to a water-insoluble form of polyvinylpyrrolidone, and it particularly relates to a product of the aforesaid nature wherein the essential chemical and physical characteristics of the polyvinylpyrrolidone are substantially retained.

Polyvinylpyrrolidone, generally referred to as PVP, is a well known polymer of vinylpyrrolidone which is not only water-soluble but hygroscopic and is useful for many purposes. For example, it has marked detoxifying properties whereby it binds various toxins, viruses, dyes, potent drugs and other chemicals to reduce toxicity and irritation and to prolong activity. It also forms a water-soluble complex with elemental iodine whereby the toxicity of the iodine is markedly reduced while its full germicidal properties are retained. This makes it extremely useful for purifying water such as in wells, streams, springs, reservoirs, swimming pools and the like. However, the PVP, being water-soluble, is retained in solution and therefore is itself, in effect, a contaminant. Furthermore, because it does remain in solution, it is carried away with flowing or running water and, therefore, must be constantly replenished.

PVP is also capable of complexing or cross-linking with polyacids such as polyacrylic and tannic acids and their derivatives. This permits its use for beverage clarification, as in beer, wine, whiskey, fruit juices and the like. It is also useful in jellies and similar products. In beer, for example, it is used as an additive to precipitate those tannins which promote chillhaze or fogging of the beer. It also increases the removal of "trub," causing the formation of larger flocs which settle rapidly, thereby improving the flavor and enhancing the foam and body of the beer. However, here too, it remains in solution and is consumed with the beverage.

It is an object of the present invention, therefore, to provide a material having all the physical and chemical properties of PVP but in a water-insoluble form whereby it does not require replenishment and is not retained as a contaminant in the liquid.

Another object of the present invention is to provide an easy and economical method for producing the aforesaid water-insoluble product.

Other objects and many of the attendant advantages of this invention will be readily appreciated as the same becomes better understood by reference to the following description and claims.

It has heretofore been known to insolubilize PVP in various manners such as by heating in air to about 150° C., heating in strong alkali at about 100° C., treating with ammonium persulfate at about 90° C., treating with diazo compounds and oxidizing agents under the influence of actinic radiation, or precipitating the PVP from aqueous solution by means of resorcinol and pyrogallol. However, in the last-mentioned process, the complex redissolves in additional water, while in the other processes, there is an undersirable change in the physical and/or chemical characteristics of the products.

According to the present invention, a water-insoluble form of PVP is obtained having all its essential physical and chemical properties substantially unaltered. This is accomplished by mixing PVP, in solution form, with a granular synthetic calcium silicate available commercially under the name "Microcel" and produced by the Johns-Manville Co. of New York, N.Y. When admixed, the PVP is adsorbed on the "Microcel" and held fast thereon.

"Microcel" is produced by a hydro-thermal reaction of diatomaceous earth with a source of calcium such as calcium oxide. It comprises by weight about 51.7% $SiO_2$, about 25.3% CaO, about 1.8% $Al_2O_3$, about 0.9% $Fe_2O_3$, about 0.5% $Na_2O$–$K_2O$ and about 18% ignition loss at 1800° F. It is a granular material and is defined in "The Condensed Chemical Dictionary," 6th edition, Reinhold Publishing Corp., New York, New York, as being a finely divided, hydrated, synthetic calcium silicate.

In the preparation of the PVP–"Microcel" product, PVP is preferably dissolved in methanol and mixed with granular "Microcel," after which the mixture is dried. The complete process including the drying may be carried out at room temperature, thereby avoiding any oxidation or other chemical alterations of the product.

If the product is to be used in a column for liquid purification purposes, it is preferably intermixed with a filter material such as a diatomaceous earth produced under the name "Celite 545" by the Johns-Manville Corp., New York, N.Y. This "Celite 545" is a highly porous material with a peak flow rate.

The following examples are illustrative but non-limitative of methods of preparing the PVP–"Microcel" product in accordance with its proposed utilization.

*Example 1*

1 g. PVP is dissolved in 5 ml. methanol and admixed with 9 g. "Microcel." The flask which contained the PVP is then washed three times with methanol, using 1 ml. methanol each time. The mixture is then thoroughly agitated, after which it is dried at room temperature. About 449 mg. of PVP is adsorbed on the "Microcel."

*Example 2*

9 g. "Microcel" and 10 g. "Celite 545," in granular form, are thoroughly intermixed and 75 ml. methanol is then added to make the powder fluid so that it can be easily poured. The mixture is then poured into a 1 inch glass column. 1 g. PVP is dissolved in 100 ml. methanol and this solution is dropped onto the column and washed with an additional 75 ml. methanol. About 415 mg. of PVP is adsorbed on the "Microcel."

*Example 3*

9.7 g. "Microcel," 300 mg. PVP dissolved in 5 ml. methanol and 10 g. "Celite 545" are thoroughly mixed and dried by exposure to air. The mixture is then placed in a 1 inch glass column and washed with 75 ml. methanol. Almost complete adsorption of the PVP takes place.

*Example 4*

1.5 g. of an aqueous solution of PVP (containing 300 mg. PVP) is admixed with about 10 ml. methanol and about 9.7 g. "Microcel." After these ingredients are thoroughly mixed and dried, "Celite 545" is added. The resulting mixture is placed in a 1 inch column and treated as in Example 3 above. About 267 mg. is adsorbed on the "Microcel."

*Example 5*

2 g. of a "Microcel" powder containing 3% PVP by weight is treated with 50 ml. 0.2 N HCl to insure acidity of the earth; 4 g. of "Celite 545" is added and the whole placed on a column. 50 ml. of a water solution saturated with iodine is added to the column and mild vacuum applied.

The heaviest brown color appears near the top of the column and it becomes very light near the bottom. Only a small amount of unadsorbed iodine is to be found in the filtrate. In contrast, in the absence of PVP, the column is uniformly colored with iodine and most of the iodine is found in the filtrate.

When the PVP column is washed with water, the iodine is slowly eluted, leaving the PVP on the column once more free to adsorb iodine and thus repeat the cycle.

The following experiments further show the remarkable affinity of "Microcel" for PVP.

A small amount of radioactive PVP was mixed with "Microcel." After refluxing with 6 N HCl for 40 minutes, no activity could be found in the acid solution.

Again, 200 mg. "Microcel" was placed in a column and ½ mg. of radioactive PVP (5 microcuries/gram) dissolved in 60 ml. methanol was passed over the column. Only two counts per minute over background could be detected in the filtrate.

Alternatively, when methanolic solutions of radioactive PVP were treated with three successive portions of "Microcel," all the radioactivity was removed from the solution in a short period of time and found on the "Microcel."

Although "Microcel," a synthetic calcium silicate, has been disclosed hereinabove and is used in the preferable embodiment of the invention, other synthetic alkaline earth silicates, such as the synthetic magnesium, strontium and barium silicates, may be substituted. One example of such other type silicates is a synthetic, hydrous magnesium silicate produced under the trade name "Celkate" by the Johns-Manville Co. This latter product is produced in similar manner to the "Microcel" but using a source of magnesium instead of calcium.

Obviously many modifications and variations of the present invention are possible in the light of the above teachings. It is, therefore, to be understood that within the scope of the appended claims, the invention may be practiced otherwise than as specifically described.

The invention claimed is:

1. A water-insoluble product consisting essentially of polyvinylpyrrolidone adsorbed on granular, hydrated, synthetic calcium silicate.

2. A water-insoluble product consisting essentially of a complex of iodine and polyvinylpyrrolidone adsorbed on granular, hydrated, synthetic calcium silicate.

3. A method of treating aqueous liquids to remove impurities therefrom which comprises passing said liquids over a water-insoluble product consisting essentially of polyvinylpyrrolidone adsorbed on granular, hydrated, synthetic calcium silicate.

4. A method of treating aqueous liquids to remove impurities therefrom and to sterilize said liquids which comprises passing said liquids over a water-insoluble product consisting essentially of a complex of iodine and polyvinylpyrrolidone adsorbed on granular, hydrated, synthetic calcium silicate.

References Cited by the Examiner

UNITED STATES PATENTS

| | | | |
|---|---|---|---|
| 2,508,602 | 5/50 | Goetz | 210—501 |
| 2,811,449 | 10/57 | Witwer | 99—48 |
| 2,900,305 | 8/59 | Siggia | 167—17 XR |
| 3,033,648 | 5/62 | Vander Linden | 252—457 XR |
| 3,099,626 | 7/63 | Riede | 252—457 XR |

FOREIGN PATENTS

| | | |
|---|---|---|
| 572,682 | 3/59 | Canada. |
| 596,585 | 4/60 | Canada. |

OTHER REFERENCES

Johns-Manville Publication DS Series 450, pages FI 502, 503, 506, published May 1948 as coded at foot of each page.

PVP, Polyvinylpyrrolidone, published by "Antara Chemicals" division of General Aniline and Film Corp. (copy submitted by applicants on December 28, 1961, stating that it was published prior to applicants filing date), pages 38 and 39.

JULIUS GREENWALD, *Primary Examiner.*

CARL F. KRAFFT, *Examiner.*